United States Patent
Ushigami (10) Patent No.: US 8,423,809 B2
(45) Date of Patent: Apr. 16, 2013

(54) POWER CONSUMPTION MEASURING AND POWER TRANSMISSION MONITORING FOR DATA TRANSFER

(75) Inventor: Shinji Ushigami, Kanagawa (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 12/870,311

(22) Filed: Aug. 27, 2010

(65) Prior Publication Data

US 2011/0078471 A1    Mar. 31, 2011

(30) Foreign Application Priority Data

Sep. 28, 2009 (JP) ................. 2009-222844

(51) Int. Cl.
*G06F 1/32* (2006.01)
(52) U.S. Cl.
USPC .......................... 713/320; 713/340
(58) Field of Classification Search ........... 713/300–340
See application file for complete search history.

(56) References Cited

U.S. PATENT DOCUMENTS

| | | | | |
|---|---|---|---|---|
| 6,526,516 B1* | 2/2003 | Ishikawa et al. | ............. | 713/340 |
| 6,810,481 B1* | 10/2004 | Kawade et al. | ............. | 713/300 |
| 7,069,347 B1* | 6/2006 | Kolokowsky | ............. | 710/8 |
| 7,310,697 B2* | 12/2007 | Pandit et al. | ............. | 710/313 |
| 7,631,200 B2* | 12/2009 | Niwa et al. | ............. | 713/300 |
| 2002/0065618 A1* | 5/2002 | Oh | ............. | 702/57 |
| 2003/0088798 A1* | 5/2003 | Ono et al. | ............. | 713/310 |
| 2007/0143505 A1* | 6/2007 | Terrell, II | ............. | 710/10 |

FOREIGN PATENT DOCUMENTS

JP      2004-86359      3/2004

* cited by examiner

*Primary Examiner* — Raymond Phan
(74) *Attorney, Agent, or Firm* — Oblon, Spivak, McClelland, Maier & Neustadt, L.L.P.

(57) ABSTRACT

An access control apparatus of a data storage device includes a first connecting unit configured to be removably connected with a power supply device, perform data transmission through a first data-transmission line, and be supplied with power through a first power-transmission line, a second connecting unit configured to be removably connected with the data storage device, perform data transmission through a second data-transmission line, and supply power through a second power-transmission line, a data transfer processing unit configured to perform data transfer between the power supply device and the data storage device, a power consumption measuring unit configured to measure power supplied from the power supply device through the first power-transmission line, and a power-transmission capability monitoring unit configured to control the data transfer processing unit in accordance with power consumption measured by the power consumption measuring unit.

2 Claims, 9 Drawing Sheets

FIG. 9A POWER-TRANSMISSION LINE A (POWER CONSUMPTION)

FIG. 9B COMMUNICATION LINE A (OPERATING STATE)

POWER CONSUMPTION MEASURING AND POWER TRANSMISSION MONITORING FOR DATA TRANSFER

BACKGROUND OF THE INVENTION

1. Field of the Invention

The present invention relates to an access control apparatus of a data storage device. The access control apparatus controls an access to the data storage device which is removably connected thereto.

2. Description of the Related Art

An access control apparatus for controlling an access to a data storage device which is removably connected thereto commonly supplies power to the data storage device to drive the data storage device. Therefore, power consumption of the access control apparatus changes depending on an operation of the data storage device.

Here, examples of the access control apparatus include an access control apparatus of a bus-power type and an access control apparatus of a self-power type (Japanese Unexamined Patent Application Publication No. 2004-86359). The access control apparatus of the bus-power type operates by using supply current of a bus-power supply device which is connected thereto through a signal cable such as a USB and an IEEE1394. The access control apparatus of the self-power type operates by using self power such as an AC adapter and an auxiliary battery.

The access control apparatus of the bus-power type which is designed to be used within an acceptable range of a bus power specification can operate only by connecting a signal cable to a bus-power supply device. Therefore, the access control apparatus of the bus-power type can be used outdoors or in a place having a difficulty in securing electric power, thus providing higher degree of freedom of a utilization place, compared to the access control apparatus of the self-power type which uses an AC adapter, an auxiliary battery, or the like.

SUMMARY OF THE INVENTION

However, in a case where an added value of power consumption of the access control apparatus of the bus-power type and power consumption of the data storage device which is connected to the access control apparatus exceeds the maximum power supply capability of the bus-power supply device, the following problem arises. Namely, in this case, power for operating the access control apparatus runs short, causing an abnormal operation or destruction of data stored in the data storage device.

To avoid such problem, there are a method in which an auxiliary power such as a battery is added and a method in which bus-power is switched to self-power. However, these methods do not realize space saving and simple wiring, limiting the degree of freedom of an installation space and a utilization place which are advantageous points of the apparatus of the bus-power type.

It is true that there is a case where more value of current than a specified value may be supplied depending on a mounting state of the bus-power supply device. However, the access control apparatus does not grasp the maximum bus-power supply capability, so that the access control apparatus has not used power at a specified value or more even in an environment in which the apparatus normally operates at power consumption of the specified value or more.

Further, it has been difficult for the access control apparatus to grasp power consumption thereof because power consumption of the data storage device which is removably connected thereto changes depending on a storage capacity, an accessible speed, and the like. Thus, in a case where the power consumption exceeds a bus power supply limit, a defect of the access control apparatus which is not recognized by the bus-power supply device arises or data of the data storage device is destroyed.

It is desirable to provide an access control apparatus of a data storage device. The access control apparatus is securely capable of performing data transfer between a power supply device and the data storage device within power which can be supplied from the power supply device.

An access control apparatus of a data storage device, according to an embodiment of the present invention, includes a first connecting unit configured to be removably connected with a power supply device, perform data transmission through a first data-transmission line, and be supplied with power through a first power-transmission line, a second connecting unit configured to be removably connected with the data storage device, perform data transmission through a second data-transmission line, and supply power through a second power-transmission line, a data transfer processing unit configured to perform data transfer between the power supply device and the data storage device, a power consumption measuring unit configured to measure power supplied from the power supply device through the first power-transmission line, and a power-transmission capability monitoring unit configured to control the data transfer processing unit in accordance with power consumption measured by the power consumption measuring unit. In the access control apparatus of a data storage device, the data transfer processing unit includes a test data communication unit that performs transmission of test data to the power supply device through the first data-transmission line while changing power load in multiple stages, in a manner to be free from supplying power to the data storage device. Further, in the access control apparatus, the power-transmission capability monitoring unit includes a storing unit that stores a maximum power-transmission power at which the test data communication unit can perform data transmission at a highest power load, depending on a measurement result of the power consumption measuring unit, and controls the data transfer processing unit such that the data transfer processing unit starts data transfer between the power supply device and the data storage device and temporarily stops an access to the data storage device in a period during which power consumption measured by the power consumption measuring unit exceeds the maximum power-transmission power stored in the storing unit.

In the embodiment of the present invention, an operation of the data transfer processing unit is controlled to start the data transfer between the power supply device and the data storage device, and temporarily stop an access to the data storage device in a period during which power consumption measured by the power consumption measuring unit exceeds the maximum power-transmission power stored in the storing unit. Thus, in the embodiment of the present invention, an access to the data storage device is controlled based on the maximum power-transmission power. Accordingly, the access control apparatus can stably operate within power which can be supplied from the power supply device and securely perform the data transfer between the power supply device and the data storage device.

DESCRIPTION OF THE PREFERRED EMBODIMENTS

An embodiment of the present invention will now be described with reference to the accompanying drawings. It should be understood that the present invention is not limited to the embodiment described below and various modifications and alterations may occur within the scope of the invention.

An access control apparatus of a data storage device according to the embodiment of the present invention is an apparatus for controlling an access to a data storage device which is removably connected to the apparatus. Such an access control apparatus is applied as a removable media control apparatus 1 shown in FIG. 1, for example, and is built to be used in a data transfer system 100 that performs data transfer between a host device 2 and a removable media 3. The description is offered in the following order.
1. Whole Configuration
2. Data Transfer Processing
3. Operative Example
<1. Whole Configuration>

Figure 1:
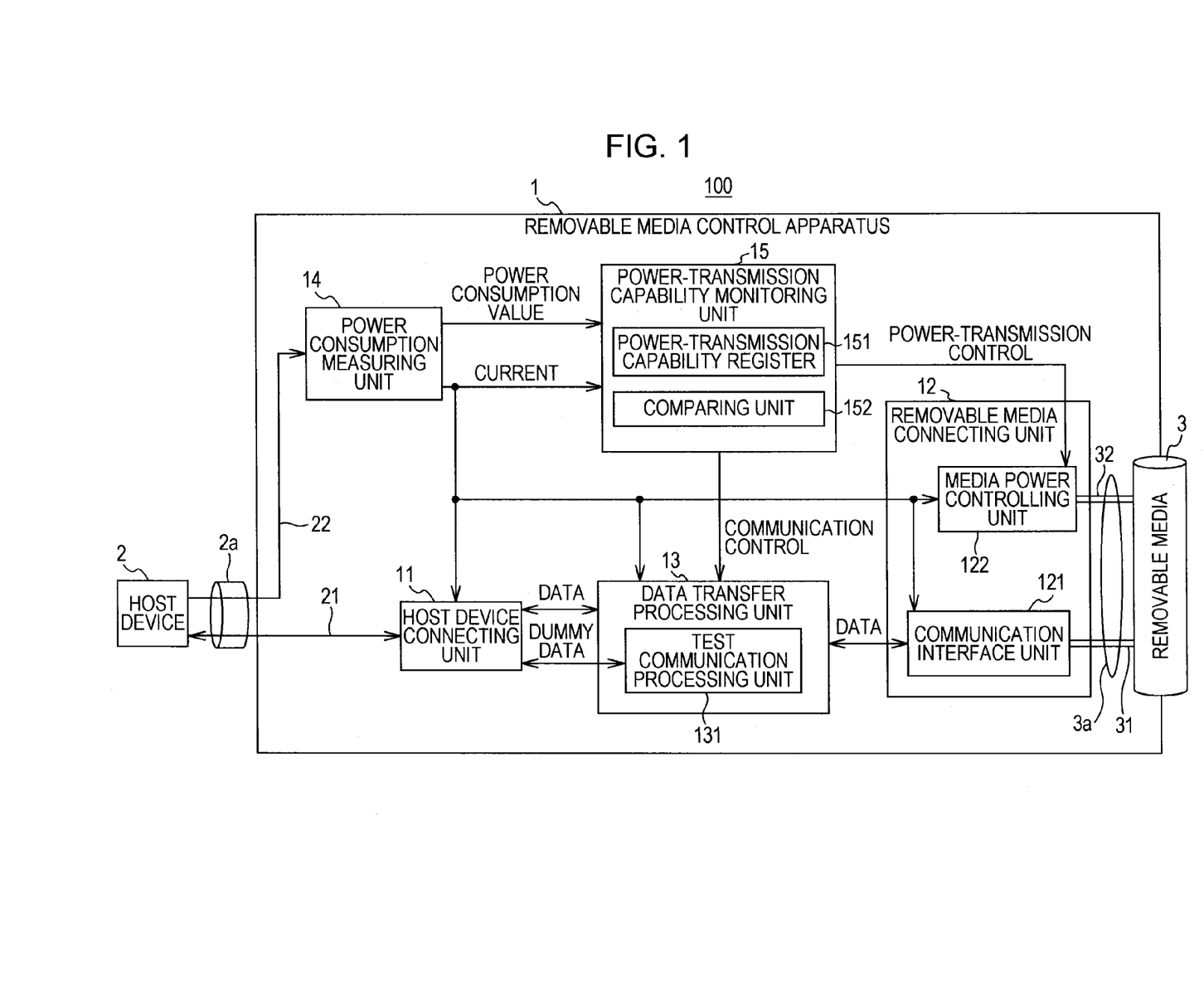
FIG. 1 illustrates the whole configuration of a data transfer system in which an access control apparatus of a data storage device according to an embodiment of the present invention is built.

The removable media control apparatus 1 corresponds to an access control apparatus of a data storage device according to the embodiment of the present invention and is removably connected with the host device 2 and the removable media 3.

The host device 2 is a power supply device which is removably connected with the removable media control apparatus 1 through a communication interface cable 2a such as a USB and an IEEE1394 capable of supplying bus power. The host device 2 supplies bus power to the removable media control apparatus 1 through the communication interface cable 2a so as to operate the removable media control apparatus 1. Further, the host device 2 transmits and receives data to and from the removable media control apparatus 1 through the communication interface cable 2a.

The removable media 3 is a removable data storage device such as a removable hard disk drive, a micro drive, or a memory card. The removable media 3 is connected with the removable media control apparatus 1 through a communication interface 3a capable of supplying power. The removable media 3 operates by receiving power supply from the removable media control apparatus 1. Further, a storage region of the removable media 3 is accessed by the removable media control apparatus 1 and thus the removable media 3 transmits and receives data to and from the host device 2 through the removable media control apparatus 1.

In the data transfer system 100 configured as described above, specific configuration and operation of the removable media control apparatus 1 are focused to be described below.

The removable media control apparatus 1 includes a host device connecting unit 11 connecting with the host device 2 and a removable media connecting unit 12 connecting with the removable media 3. The removable media control apparatus 1 further includes a data transfer processing unit 13 that performs data transfer, a power consumption measuring unit 14 that measures power consumption, and a power-transmission capability monitoring unit 15 that controls an operation of the data transfer processing unit 13 in response to a measurement result of the power consumption measuring unit 14.

The host device connecting unit 11 is removably connected with the host device 2 through the communication interface cable 2a. Specifically, the host device connecting unit 11 transmits and receives data to and from the host device 2 through a data-transmission line 21 which is provided in the communication interface cable 2a. Further, the host device connecting unit 11 is supplied with bus power from the host device 2 through a power-transmission line 22 which is provided in the communication interface cable 2a and the power consumption measuring unit 14 which will be described later.

The removable media connecting unit 12 is removably connected with the removable media 3 through the communication interface 3a. Specifically, the removable media connecting unit 12 includes a communication interface unit 121 and a media power controlling unit 122. The communication interface unit 121 transmits and receives data to and from the removable media 3 through a data-transmission line 31 which is provided in the communication interface 3a. The media power controlling unit 122 supplies bus power to the removable media 3 through a power-transmission line 32 provided in the communication interface 3a, in accordance with a control command from the power-transmission capability monitoring unit 15 which will be described later.

The data transfer processing unit 13 performs data transfer between the host device 2 and the removable media 3. Specifically, when the data transfer processing unit 13 receives a data writing command with respect to the removable media 3 from the host device 2 through the host device connecting unit 11, the data transfer processing unit 13 performs processing for transferring data, which is transmitted from the host device connecting unit 11, to the removable media 3. When the data transfer processing unit 13 receives a data reading command with respect to the removable media 3 from the host device 2 through the host device connecting unit 11, the data transfer processing unit 13 performs processing for transferring data read out from the removable media 3 to the host device 2.

Further, the data transfer processing unit 13 includes a test communication processing unit 131 that performs test communication with the host device 2 in accordance with a control command from the power-transmission capability monitoring unit 15 which will be described later. The test communication processing unit 131 performs communication using dummy data as test data with the host device 2 while changing power load in multiple stages, in a manner to supply no power to the removable media 3, as specifically described later.

The power consumption measuring unit 14 is connected with the power-transmission line 22 provided in the communication interface cable 2a and supplies power which is supplied from the host device 2 to each unit of the removable media control apparatus 1. Here, power supplied from the host device 2 changes in accordance with an operating state of the removable media control apparatus 1 and the removable media 3, so that the power consumption measuring unit 14 measures an added value of power consumed by the removable media control apparatus 1 and power consumed by the removable media 3. Then, the power consumption measuring unit 14 informs the consumption power which is measured thereby to the power-transmission capability monitoring unit 15.

The power-transmission capability monitoring unit 15 has the following configuration in order to control an operation of the data transfer processing unit 13 in accordance with the power consumption measured by the power consumption measuring unit 14. Namely, the power-transmission capability monitoring unit 15 includes a power-transmission capability register 151 and a comparing unit 152. The power-transmission capability register 151 stores the maximum power-transmission power at which the test communication processing unit 131 can perform data transmission in a state of the highest power load. The comparing unit 152 compares power consumption measured by the power consumption measuring unit 14 to the maximum power-transmission power.

The power-transmission capability monitoring unit 15 controls the data transfer processing unit 13 to start data transfer between the host device 2 and the removable media 3 and, depending on a comparison result of the comparing unit 152, temporarily stop an access to the removable media 3 in a period during which the power consumption exceeds the maximum power-transmission power.

The removable media control apparatus 1 having the above-mentioned configuration controls an access to the removable media 3 based on the maximum power-transmission power acquired by the test communication processing. By such processing, the removable media control apparatus 1 stably operates within power which can be supplied from the host device 2 and can securely perform data transfer between the host device 2 and the removable media 3.

<2. Data Transfer Processing>

Figure 2:
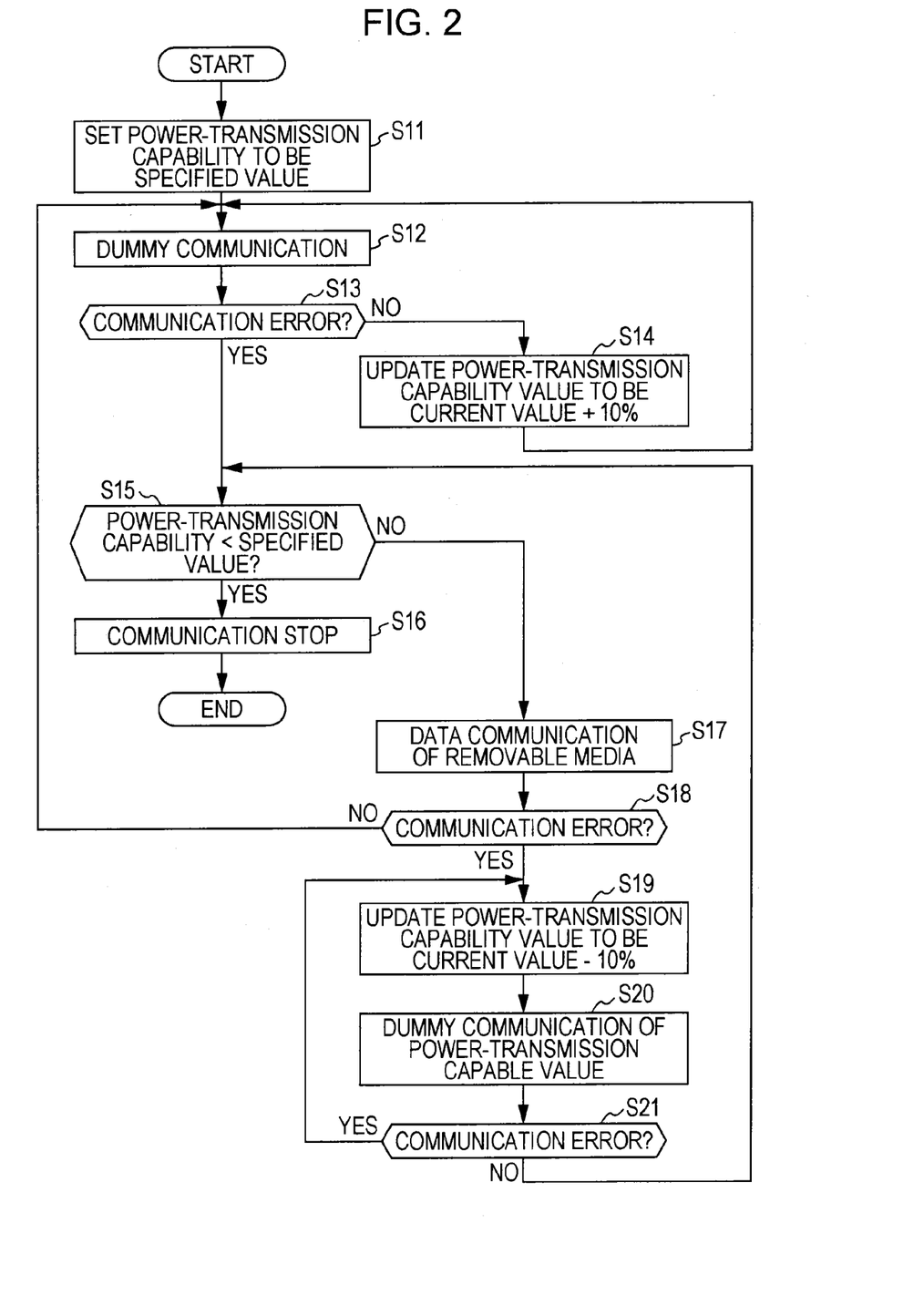
FIG. 2 is a flowchart for explaining specific data transfer processing performed by a removable media control apparatus.

Specific data transfer processing performed by the removable media control apparatus 1 is now described with reference to FIG. 2. Here, it is assumed that the removable media control apparatus 1 operates by power supplied from the power-transmission line 22 which is provided to the communication interface cable 2a. Further, it is assumed that the removable media control apparatus 1 is in a state supplying no power to the removable media 3 which is connected therewith through the communication interface 3a.

In step S11, the power-transmission capability monitoring unit 15 sets power supplied from the host device 2 to be a specified value communicable through the data-transmission line 21, and thus establishes a connection between the host device 2 and the data transfer processing unit 13. Here, the communicable specified value is a value showing bus power which is minimally allowed for maintaining communication which follows a predetermined communication specification. Then the power-transmission capability monitoring unit 15 controls the test communication processing unit 131 to perform test communication with the host device 2.

In step S12, the power-transmission capability monitoring unit 15 controls the test communication processing unit 131 to perform the test communication with the host device 2 by using dummy data.

In step S13, the test communication processing unit 131 determines whether an error occurs in the data communication of dummy data with the host device 2 or not. When the communication error does not occur, the process goes to step S14. When the communication error occurs, the process goes to step S15.

In step S14, the power-transmission capability monitoring unit 15 increases power-transmission capability power of the host device 2 by 10% and stores the increased power value in the power-transmission capability register 151 as information showing the maximum power-transmission power. In specific, the test communication processing unit 131 increases communication load by test data used in test communication with the host device 2 so as to increase a power-transmission capability value from the host device 2. Then, the process goes back to step S12.

In step S15, the power-transmission capability monitoring unit 15 determines whether a current power-transmission capability value of the host device 2 is smaller than the specified value set in step S11 or not. Here, when the power-transmission capability value is smaller than the specified value, the process goes to step S16. When the power-transmission capability value is not smaller than the specified value, the process goes to step S17.

In step S16, the power-transmission capability monitoring unit 15 controls the data transfer processing unit 13 to stop the communication with the host device 2, and the processing process is ended.

In step S17, the removable media control apparatus 1 supplies power to the removable media 3 so as to drive the removable media 3 and start data transfer between the host device 2 and the removable media 3. Then, the process goes to step S18.

In step S18, the data transfer processing unit 13 determines whether a communication error occurs in the data transfer between the host device 2 and the removable media 3 or not. When the communication error does not occur, the process goes back to step S12. When the communication error occurs, the process goes to step S19.

In step S19, the power-transmission capability monitoring unit 15 controls the data transfer processing unit 13 to suspend the data transfer processing. Further, the power-transmission capability monitoring unit 15 decreases the power-transmission capability power of the host device 2 by 10% and stores the decreased power value in the power-transmission capability register 151 as information showing the maximum power-transmission power. Furthermore, the power-transmission capability monitoring unit 15 controls the data transfer processing unit 13 to suspend the data transfer and perform test communication processing. Then, the process goes to step S20.

In step S20, the power-transmission capability monitoring unit 15 controls the test communication processing unit 131 to perform test communication with the host device 2 by using dummy data. Then, the process goes to step S21.

In step S21, the test communication processing unit 131 determines whether a communication error occurs in the data communication between the host device 2 and the removable media 3 or not. When the communication error occurs, the process goes back to step S19. When the communication error does not occur, the process goes back to step S15.

Figure 3:
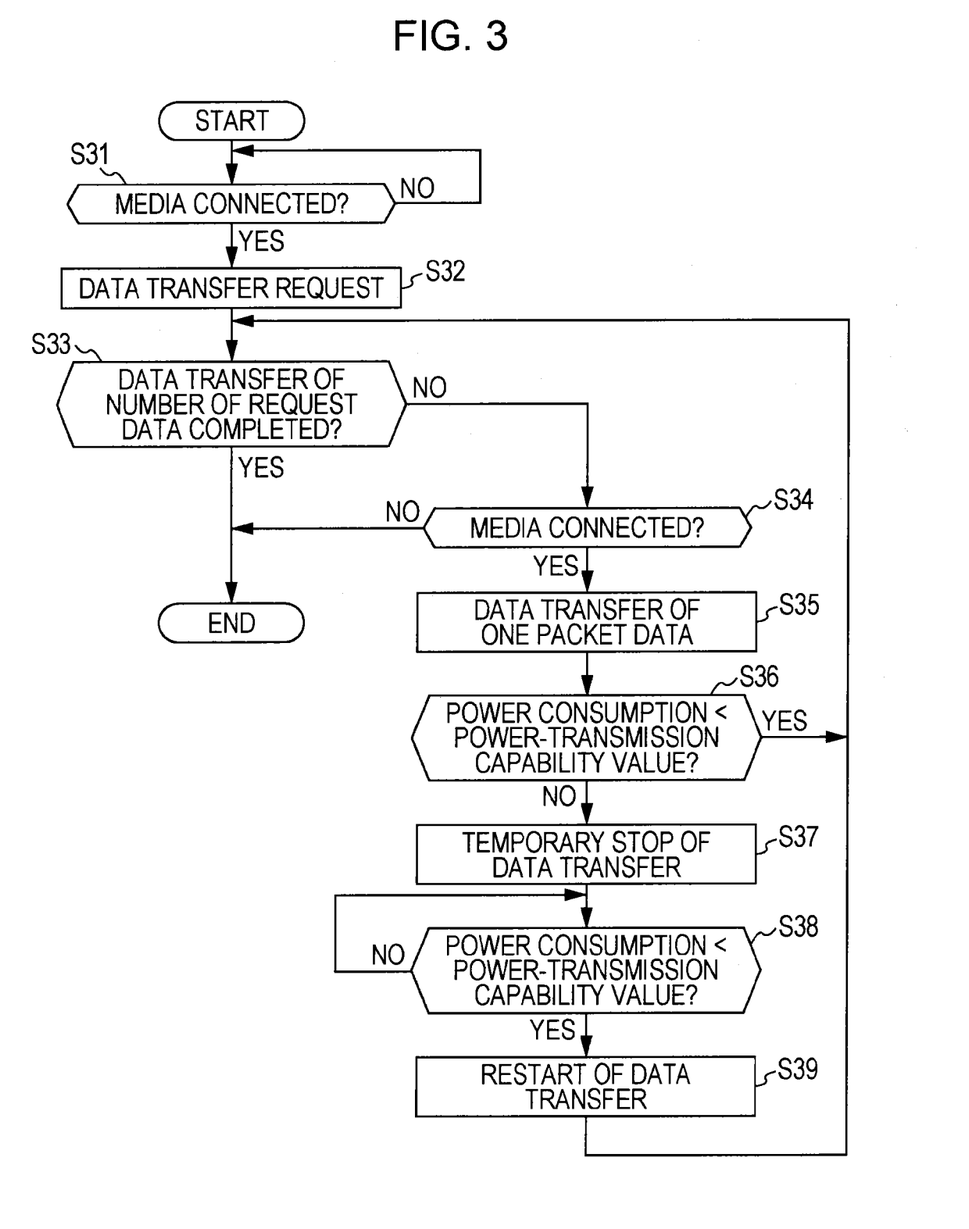
FIG. 3 is a flowchart for explaining the specific data transfer processing performed by the removable media control apparatus.

Next, the processing according to step S17 is specifically described with reference to FIG. 3.

In step S31, the removable media connecting unit 12 repeatedly determines whether the removable media 3 is connected or not until the connection is confirmed. After that, the process goes to step S32.

In step S32, the data transfer processing unit 13 requests the removable media 3 to perform data transfer corresponding to an access request received from the host device 2. Then, the process goes to step S33.

In step S33, the data transfer processing unit 13 determines whether data transfer in an amount corresponding to the number of request data transmitted from the host device 2 is completed or not. When the data transfer is completed, the transfer processing is ended. When the data transfer is not completed, the process goes to step S34.

In step S34, the removable media connecting unit 12 determines whether the removable media 3 is connected or not. When the connection is confirmed, the process goes to step S35. When the connection is not confirmed, the transfer processing is ended.

In step S35, the data transfer processing unit 13 performs data transfer of one packet which is the minimum transmission data unit between the host device 2 and the removable media 3. Then, the process goes to step S36.

In step S36, the power-transmission capability monitoring unit 15 compares power consumption measured by the power consumption measuring unit 14 to the maximum power-transmission power stored in the power-transmission capability register 151, with the comparing unit 152 thereof. Then, when the power consumption does not exceed the maximum power-transmission capability, the process goes back to step S33. When the power consumption exceeds the maximum power-transmission capability, the process goes to step S37.

In step S37, the data transfer processing unit 13 temporarily stops the data transfer processing so as to decrease the power load. Then, the process goes to step S38.

In step S38, the power-transmission capability monitoring unit 15 compares power consumption measured by the power consumption measuring unit 14 to the maximum power-transmission power stored in the power-transmission capability register 151, with the comparing unit 152 thereof. Then, this step is repeated until the power consumption falls below the maximum power-transmission capability, and then the process goes to step S39 when the power consumption does not exceed the maximum power-transmission capability.

In step S39, the data transfer processing unit 13 restarts the data transfer processing. Then, the process goes back to step S33.

Through the above-described processing process, the removable media control apparatus 1 controls an operation of the data transfer processing unit 13 so as to temporarily stop an access to the removable media 3 in a period during which power consumption measured by the power consumption measuring unit 14 exceeds the maximum power-transmission power stored in the power-transmission capability register 151. Thus, the removable media control apparatus 1 controls an access to the removable media 3 based on the maximum power-transmission power, so that the removable media control apparatus 1 can stably operate within power which can be supplied by the host device 2 and securely perform the data transfer between the host device 2 and the removable media 3.

<3. Operative Example>

Figure 4A:
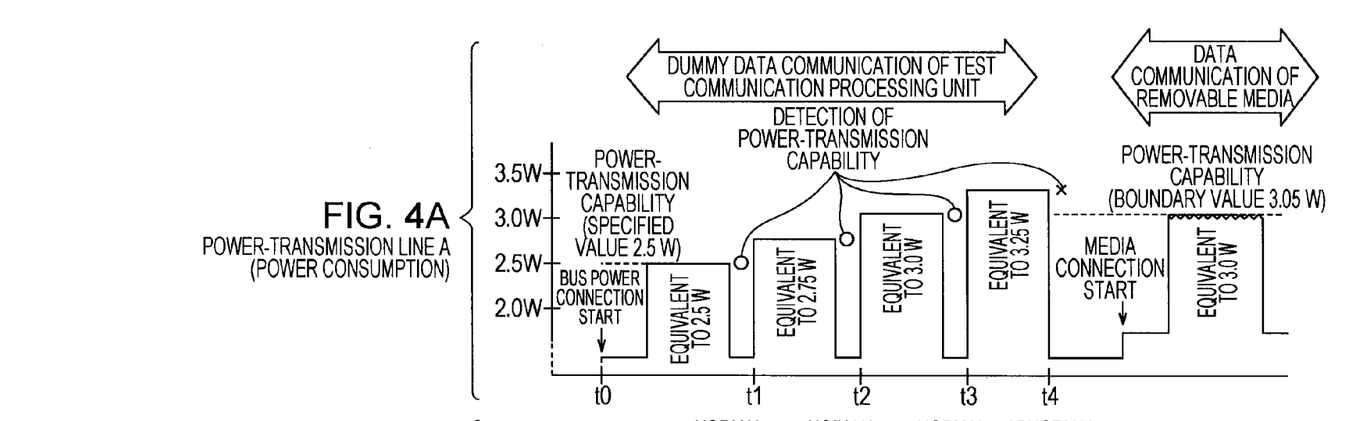
FIGS. 4A to 4D are timing diagrams for explaining an operative example of data transfer processing.
Figure 4B:
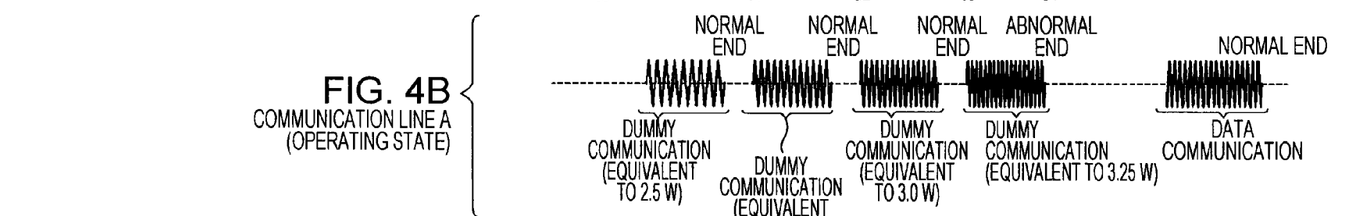
Figure 4C:
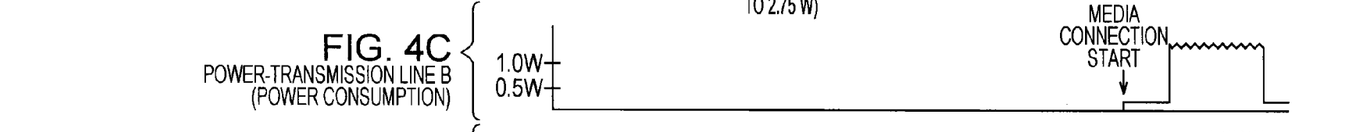
Figure 4D:
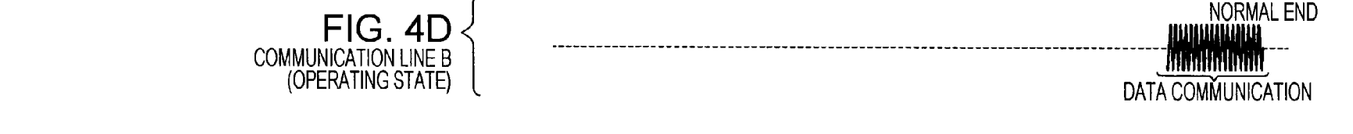

As an operative example of the data transfer processing described above, such test communication processing is described that a status with respect to a command for confirming a connecting state of a device connected in accordance with the USB specification is used as dummy data with reference to FIGS. 4A to 4D. Here, FIG. 4A is a timing diagram showing power supplied from the power-transmission line 22 in the communication interface cable 2a. FIG. 4B is a timing diagram showing a communication state of the data-transmission line 21 of the communication interface cable 2a. FIG. 4C is a timing diagram showing power supplied from the power-transmission line 32 of the communication interface 3a. FIG. 4D is a timing diagram showing a communication state of the data-transmission line 31 of the communication interface 3a.

First, from time t0 to time t1 in FIG. 4A, dummy data communication is performed in accordance with steps S11 to S13 on a condition of power load of 2.5 W which is a specified value of power supplied from the host device 2, so as to confirm that a power-transmission capability operation equivalent of 2.5 W is normal.

Next, from time t1 to time t2 in FIG. 4A, dummy data communication is performed in accordance with steps S12 to S14 on a condition of power load equivalent to 2.75 W which is 110% of 2.5 W so as to confirm a normal operation.

Subsequently, from time t2 to time t3 in FIG. 4A, dummy data communication is performed in accordance with steps S12 to S14 on a condition of power load equivalent to 3.00 W which is 120% of 2.5 W so as to confirm a normal operation.

Then, from time t3 to time t4 in FIG. 4A, dummy data communication is performed in accordance with steps S12 to S14 on a condition of power load equivalent to 3.25 W which is 130% of 2.5 W so as to confirm a normal operation.

Here, in a case where the test communication using dummy data is abnormally ended at time t4 in FIG. 4A, the power-transmission capability of the host device 2 does not satisfy power-transmission capability equivalent to 3.25 W. Accordingly, an upper limit of the power-transmission capability value is determined to be 3.00 W and is stored in the power-transmission capability register 151. For example, in a case where the test communication is abnormally ended at power-transmission capability equivalent to 2.5 W which is the specified value, it is determined that the power-transmission capability of the host device 2 does not satisfy the specified value or has a small margin of supply capability, in accordance with step S16.

Figure 5A:
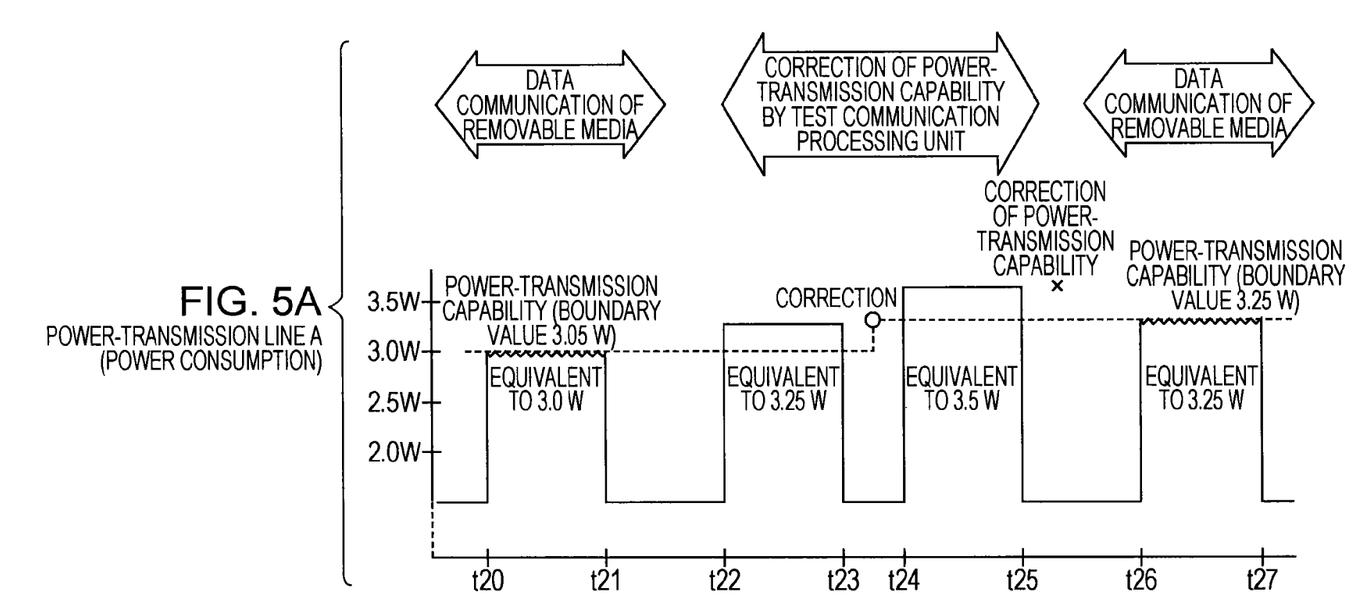
FIGS. 5A and 5B are timing diagrams for explaining correction processing by which power-transmission capability is corrected in a case where data transfer between a host device and a removable media is normally completed.
Figure 5B:
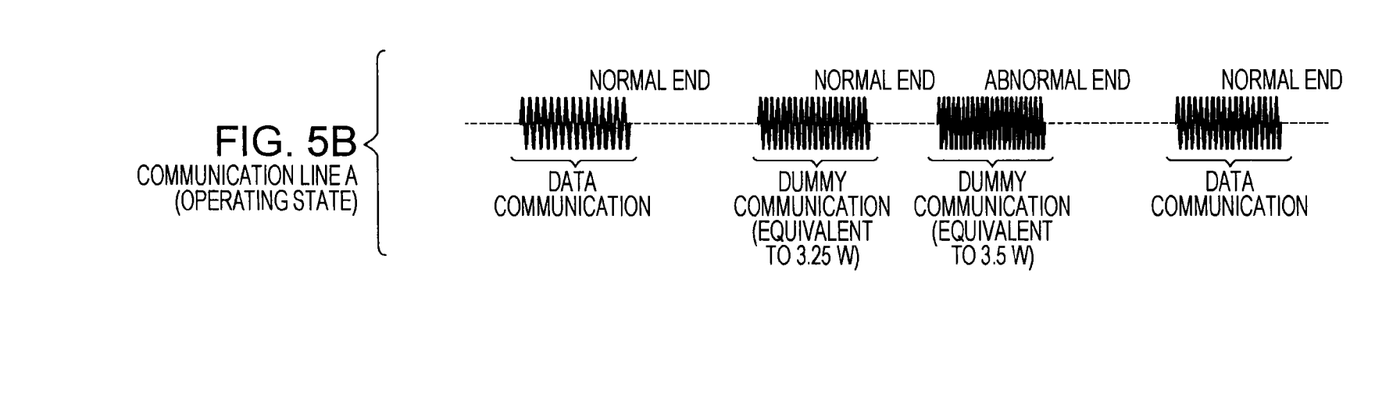
Figure 6A:
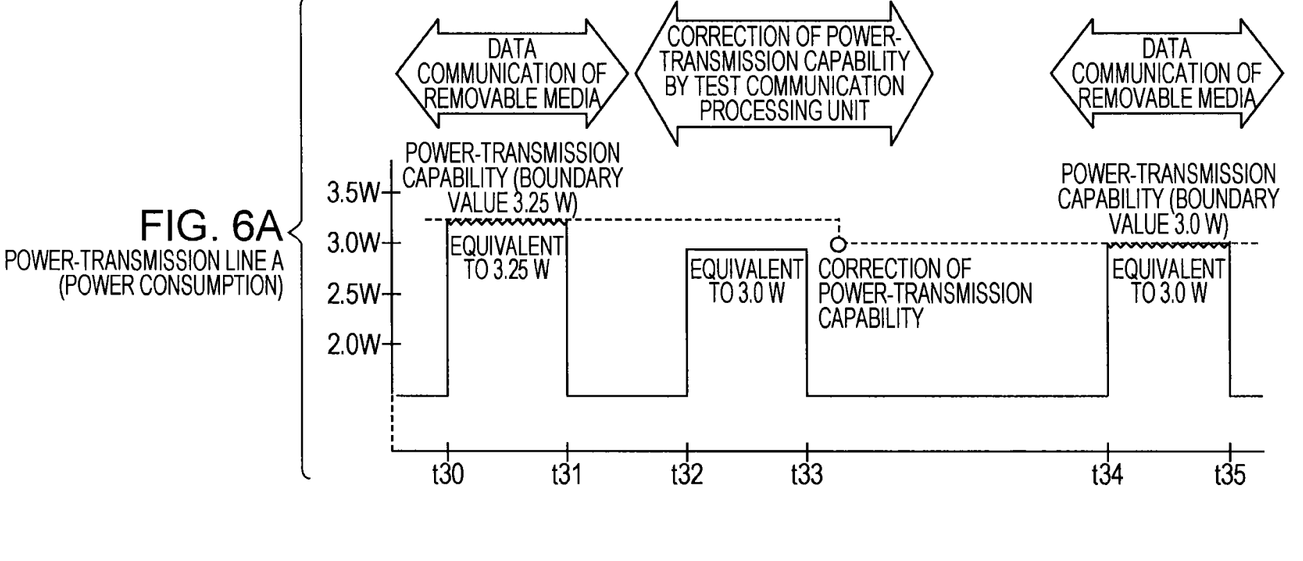
FIGS. 6A and 6B are timing diagrams for explaining correction processing by which power-transmission capability is corrected in a case where the data transfer between the host device and the removable media is not normally completed.
Figure 6B:
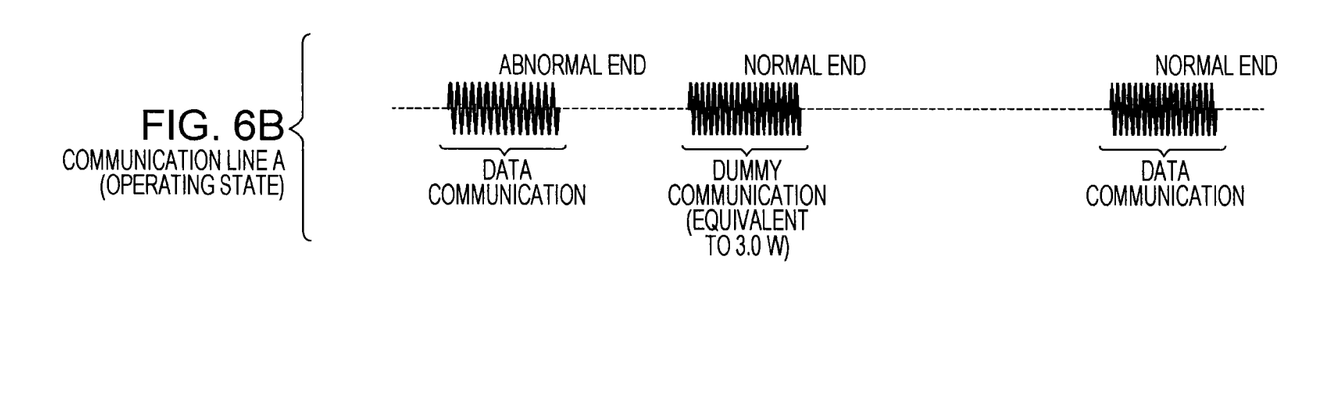

Next, specific processing after the start of the data transfer between the host device 2 and the removable media 3 is described with reference to FIGS. 5A to 6B. Here, FIGS. 5A and 6A are timing diagrams showing power supplied from the power-transmission line 22 in the communication interface cable 2a. FIGS. 5B and 6B are timing diagrams showing a communication state of the data-transmission line 21 of the communication interface cable 2a.

Correction processing for correcting the power-transmission capability in a case where the data transfer between the host device 2 and the removable media 3 is normally completed is described with reference to FIGS. 5A and 5B.

Such correction processing is performed because the maximum power-transmission capability changes depending on a change of a state of an operation environment of the host device 2 and the removable media control apparatus 1. The removable media control apparatus 1 redetects an upper limit of the power-transmission capability in a period in which there is no data-transfer request or at an error occurrence after the data transfer, by such the correction processing. Thus, the removable media control apparatus 1 can accurately update the maximum power-transmission capability which is stored in the power-transmission capability register 151 in response to an operating state.

It is assumed that the processing according to step S17 is performed from time t20 to time t21 in FIG. 5A and the data transfer is normally completed at power-transmission capability equivalent to 3.0 W.

From time t22 to time t23 in FIG. 5A, dummy data communication is performed in accordance with steps S12 to S14 at a power load equivalent to 3.25 W which is 130% of 2.5 W so as to confirm a normal operation. Here, the following operation is described in an assumption that the data transfer is normally completed.

From time t24 to time t25 in FIG. 5A, dummy data communication is performed in accordance with steps S12 to S14 at a power load equivalent to 3.50 W which is 140% of 2.5 W so as to confirm a normal operation. Here, when the test communication using dummy data is abnormally ended, the power-transmission capability of the host device 2 does not satisfy the power-transmission capability equivalent to 3.50 W. Therefore, an upper limit of the power-transmission capability value is determined to be 3.25 W and is stored in the power-transmission capability register 151.

From time t26 to time t27 in FIG. 5A, data transfer is performed in accordance with step S17 at a power load equivalent to 3.25 W, being able to normally complete the transfer processing.

Correction processing for correcting the power-transmission capability in a case where the data transfer between the host device 2 and the removable media 3 is not normally completed is described with reference to FIGS. 6A and 6B.

It is assumed that processing in accordance with step S17 is performed from time t30 to time t31 in FIG. 6A and the data transfer is not normally completed at a power load equivalent to 3.25 W.

From time t32 to time t33 in FIG. 6A, dummy data communication is performed in accordance with steps S19 to S21 at a power load equivalent to 3.0 W which is 120% of 2.5 W so as to confirm a normal operation.

From time t34 to time t35 in FIG. 6A, data transfer is performed in accordance with step S17 at a power load equivalent to 3.0 W, being able to normally complete the transfer processing.

As is apparent from the above-described processing, the removable media control apparatus 1 according to the embodiment of the present invention is capable of performing an error response with respect to a request of data communication to the removable media 3 which is more likely abnormally ended due to power shortage.

Figure 7A:
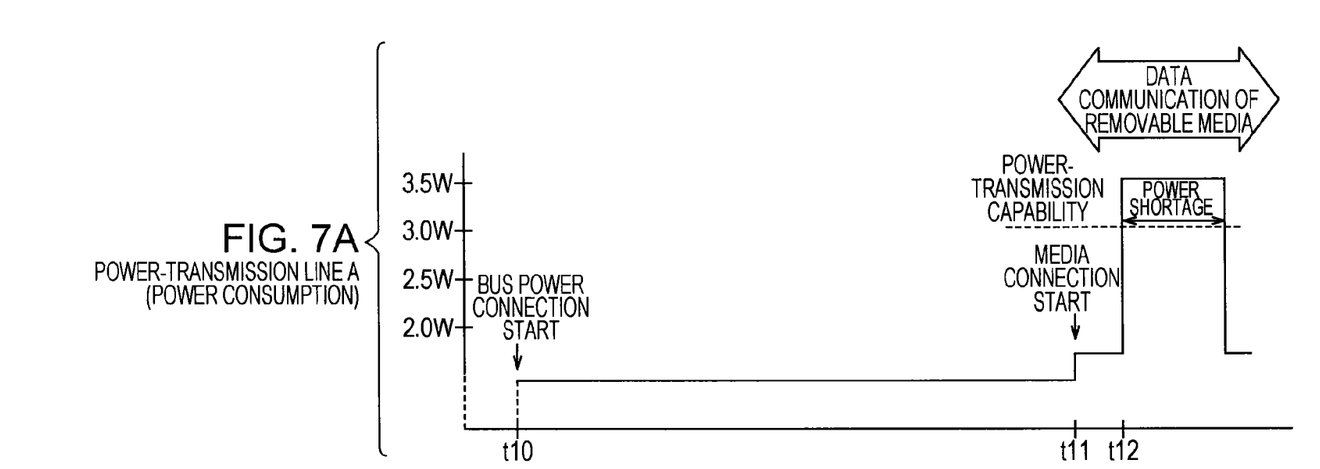
FIGS. 7A to 7D are timing diagrams for explaining a related art example of data transfer processing.
Figure 7B:
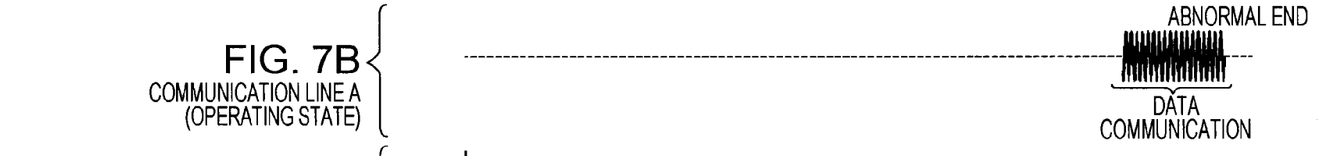
Figure 7C:
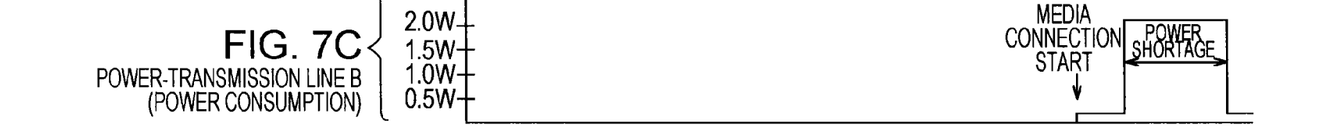
Figure 7D:
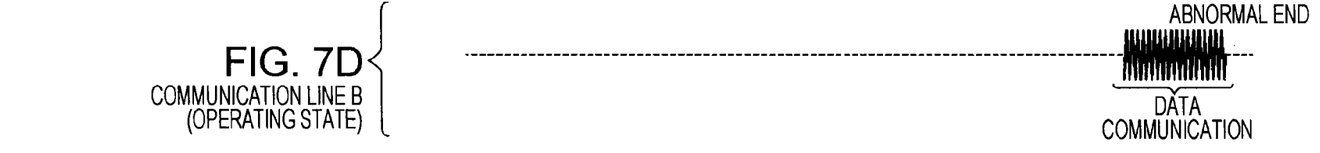

In contrast, related art data transfer processing is described with reference to FIGS. 7A to 7D. Here, FIG. 7A is a timing diagram showing power supplied from a host device. FIG. 7B is a timing diagram showing a communication state between the host device and a removable media control apparatus. FIG. 7C is a timing diagram showing power supplied to the removable media. FIG. 7D is a timing diagram showing a communication state between the removable media control apparatus and the removable media.

In the related art data transfer processing, it is assumed that the removable media control apparatus receives power supplied from the host device at time t10 in FIG. 7A, and then starts power supply to the removable media at time tn. After that, data transfer using real data is started at time t12 in the related art data transfer processing. However, the removable media control apparatus does not grasp out power-transmission capability of the host device. Therefore, when power load is increased at the highest data transfer speed, power shortage causes malfunction, causing data destruction.

As is apparent from a comparison with the related art example, the removable media control apparatus 1 according to the embodiment of the present invention can prevent data destruction caused by malfunction.

Further, the removable media control apparatus 1 performs the transfer processing in accordance with step S33 to S39 and thus controls the data transfer speed between the host device 2 and the removable media 3, being able to realize high-speed data transfer while preventing power consumption from exceeding the maximum power-transmission power.

Figure 8:
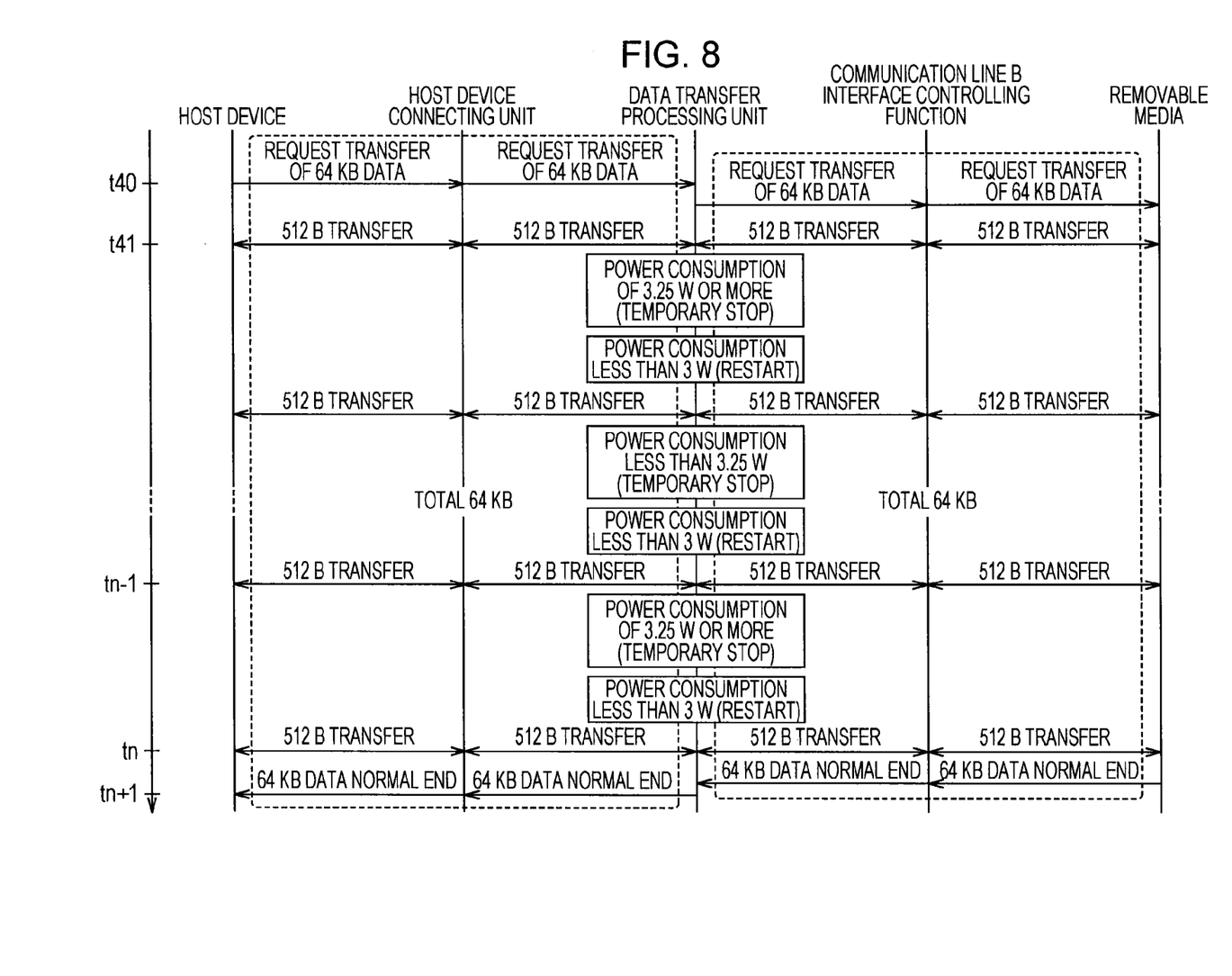
FIG. 8 is a diagram for explaining processing in which data transfer is realized at as high-speed as possible while preventing power load from exceeding the maximum power-transmission capability.
Figures 9A, 9B:
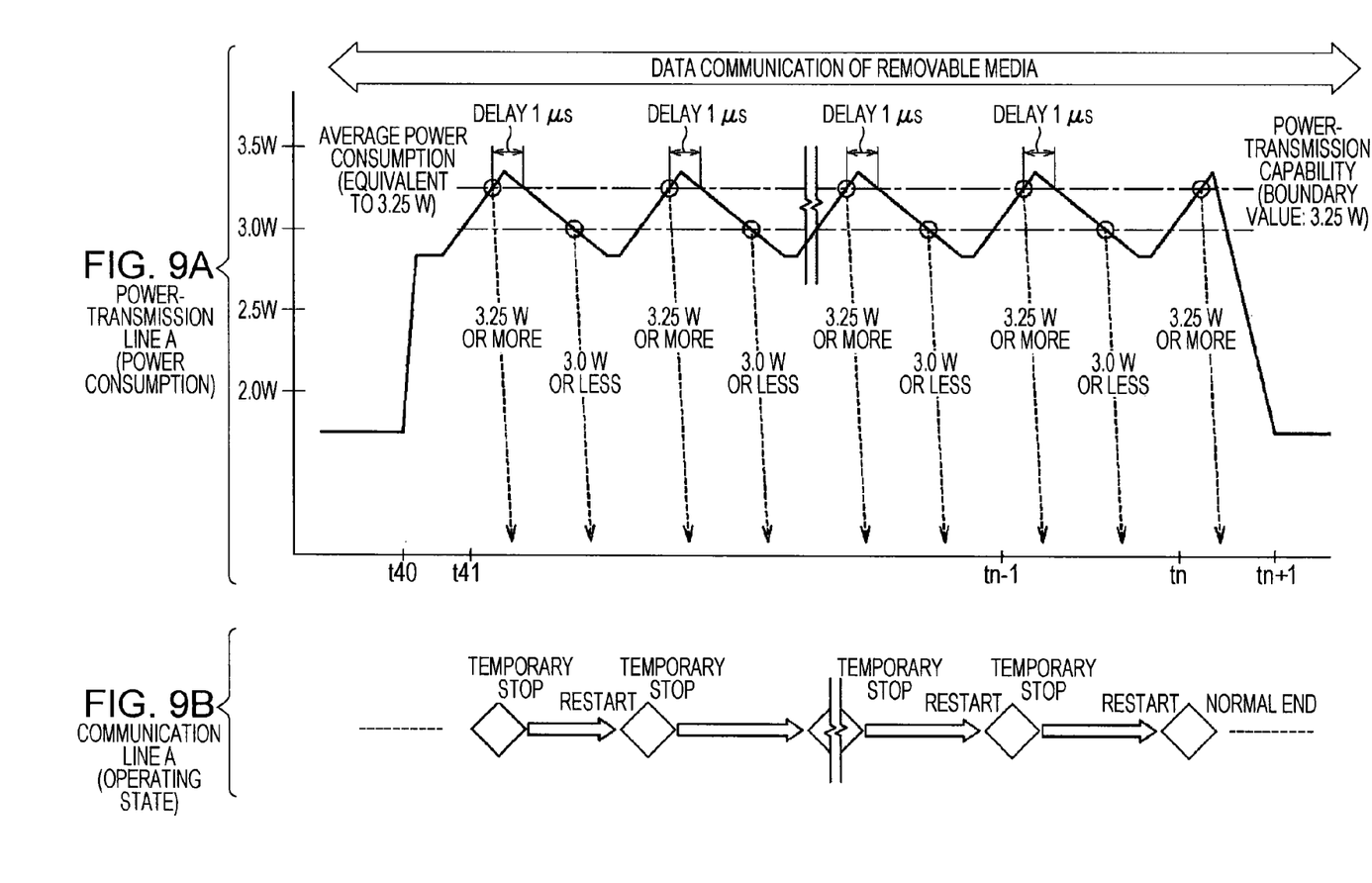
FIGS. 9A and 9B are timing diagrams for explaining the processing in which data transfer is realized at as high-speed as possible while preventing power load from exceeding the maximum power-transmission capability.

FIGS. 8 to 9B illustrate an operative example of processing in which data transfer is realized at as high-speed as possible while preventing power consumption from exceeding power load equivalent to 3.25 W which is set to be the maximum power-transmission capability.

First, it is assumed that a transfer command of 64 KB with respect to the removable media 3 is issued from the host device 2 in accordance with step S32, at time t40 shown in FIGS. 8 and 9A. Then, from time t41 to time to shown in FIGS. 8 and 9A, power consumption is compared to the maximum power-transmission capability of 3.25 W in each data transfer in which 512 bytes are set to be 1 packet, in accordance with steps S35 to S39.

At this time, the data transfer processing unit 13 performs data communication in which the power consumption does not exceed the power-transmission capability of 3.25 W while performing temporary stop and restart of the data transfer in accordance with a control command from the power-transmission capability monitoring unit 15.

For example, the power-transmission capability monitoring unit 15 uses the comparing unit 152 thereof to compare power consumption measured by the power consumption measuring unit 14 to the maximum power-transmission capability of 3.25 W stored in the power-transmission capability register 151 immediately after a transfer of 1 packet.

When the power consumption is less than 3.25 W in the comparison result, the power-transmission capability monitoring unit 15 controls the data transfer processing unit 13 to transfer new packet data without temporarily stopping the transfer, and then performs comparison processing with the comparing unit 152 mentioned above.

On the other hand, when the power consumption exceeds 3.25 W, the power-transmission capability monitoring unit 15 temporarily stops the packet data transfer to decrease power load, thus decreasing power consumption of the whole of the removable media control apparatus 1. After that, when the power-transmission capability monitoring unit 15 confirms that the power consumption is 3.00 W or less which is one stage lower than 3.25 W during the temporary stop, the power-transmission capability monitoring unit 15 controls the data transfer processing unit 13 to restart the transfer processing of new packet data. Immediately after that, the power-transmission capability monitoring unit 15 continuously performs similar comparison processing.

The power consumption exceeds the maximum power-transmission capability for about 1 μsecond in FIG. 9A. However, the removable media control apparatus 1 usually includes a charging circuit such as a capacitor therein, so that the removable media control apparatus 1 can keep its operation stable even in a temporary supply-power shortage and can transit to an operation of the temporary stop.

By repeating the above operations, the removable media control apparatus 1 can perform the data transfer in accordance with the upper limit of the power-transmission capability register 151.

Here, the power-transmission capability monitoring unit 15 preliminarily parameterizes a relationship between power consumption and the number of packets which can be continuously transferred and stores the parameter in the power-transmission capability register 151 thereof. Accordingly, the power-transmission capability monitoring unit 15 can regularly generate a temporary-stop period and thus control the power consumption in the data transfer.

Further, though the transfer processing is temporarily stopped when the power consumption is about to exceed 3.25 W in the above processing, the removable media control apparatus 1 may control its operation at three separate ranges as the following description.

For example, the removable media control apparatus 1 sets a "first range" which is less than 3.00 W, a "second range" which is from 3.00 W to less than 3.25 W, and a "third range" which is 3.25 W or more. Then, in a case of the first range, the removable media control apparatus 1 performs data transfer at a large transfer size unit with the data transfer processing unit 13. In a case of the second range, the removable media control apparatus 1 performs data transfer at a small-divided transfer size with the data transfer processing unit 13 so as to decrease average power consumption. Further, the removable media control apparatus 1 performs a power-saving operation in non-transfer period. In a case of the third range, the removable media control apparatus 1 suspends the data transfer before bus power interruption operation at a host device 2 side is carried out so as to perform error notification to the host device 2 through the data-transmission line 21.

As above, the removable media control apparatus 1 controls the data transfer speed between the host device 2 and the removable media 3 so as to prevent power consumption measured by the power consumption measuring unit 14 from exceeding the maximum power-transmission power stored in the power-transmission capability register 151. Thus, the removable media control apparatus 1 controls the data transfer speed between the host device 2 and the removable media 3, being able to perform the data transfer at high speed while preventing the power consumption from exceeding the maximum power-transmission power.

The present application contains subject matter related to that disclosed in Japanese Priority Patent Application JP 2009-222844 filed in the Japan Patent Office on Sep. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An access control apparatus of a data storage device, comprising:
    a first connecting unit configured to be removably connected with a host device, perform data transmission through a first data-transmission line, and be supplied with power through a first power-transmission line;
    a second connecting unit configured to be removably connected with the data storage device, perform data transmission through a second data-transmission line, and supply power through a second power-transmission line;
    a data transfer processing unit configured to perform data transfer between the host device and the data storage device;
    a power consumption measuring unit configured to measure power supplied from the host device through the first power-transmission line; and
    a power-transmission capability monitoring unit configured to control the data transfer processing unit in accordance with power consumption measured by the power consumption measuring unit; wherein
    the data transfer processing unit includes a test data communication unit that performs transmission of test data to the host device through the first data-transmission line while changing power load in multiple stages, in a manner to be free from supplying power to the data storage device, and
    the power-transmission capability monitoring unit includes a storing unit that stores a maximum power-transmission power at which the test data communication unit can perform data transmission at a highest power load, in response to a measurement result of the power consumption measuring unit, and controls the data transfer processing unit such that the data transfer processing unit starts data transfer between the host device and the data storage device and temporarily stops an access to the data storage device in a period during which power consumption measured by the power consumption measuring unit exceeds the maximum power-transmission power stored in the storing unit.

2. The access control apparatus of a data storage device according to claim 1, wherein the power-transmission capability monitoring unit allows the data transfer processing unit to control a data transfer speed between the host device and the data storage device so as to prevent power consumption measured by the power consumption measuring unit from exceeding the maximum power-transmission power stored in the storing unit.

* * * * *